United States Patent Office 3,564,008
Patented Feb. 16, 1971

3,564,008
PROCESS FOR PREPARING 1-ACYL-2-PHENYL-3-INDOLYLALIPHATIC ACID DERIVATIVES
Hisao Yamamoto, Nishinomiya-shi, Yasushi Nakamura, Hirakata-shi, Masaru Nakao, Osaka, Toshio Atsumi, Takarazuka-shi, and Tsuyoshi Kobayashi, Minoo-shi, Japan, assignors to Sumitomo Chemical Company, Ltd., Higashi-ku, Osaka, Japan, a corporation of Japan
No Drawing. Filed Jan. 3, 1968, Ser. No. 695,332
Claims priority, application Japan, Jan. 14, 1967, 42/2,841
Int. Cl. C07d 27/56
U.S. Cl. 260—326.13    9 Claims

ABSTRACT OF THE DISCLOSURE

A 1-acyl-2-phenyl-3-indolylaliphatic acid derivative represented by the formula,

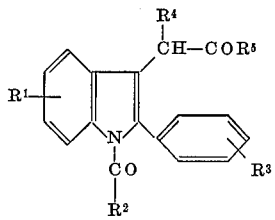

wherein $R^1$ is a hydrogen atom, a lower alkoxy group, etc.; $R^2$ is a halogen- or lower alkyl-substituted phenyl group, etc.; $R^3$ is a hydrogen atom or a lower alkyl group, etc.; $R^4$ is a hydrogen atom or a lower alkyl; and $R^5$ is a hydroxy group, etc., is obtained by reacting a corresponding $N^1$-acyl phenylhydrazine derivative or a mineral acid salt thereof with a corresponding phenyl ketone compound.

The typical examples thereof are 1-(p-chlorobenzoyl)-2-phenyl 5-methoxy - 3 - indolylacetic acid and 1-(p-methylbenzoyl)-2-phenyl - 5 - methoxy - 3 - indolylacetic acid.

The compounds thus obtained have remarkable anti-inflammatory, analgesic and antipyretic actions.

---

The present invention relates to a 3-indolylaliphatic acid derivative having remarkable anti-inflammatory, analgesic and antipyretic actions and a process for preparation thereof. More particularly, the present invention relates to a 1-acyl-2-phenyl-3-indolylaliphatic acid derivative represented by the formula,

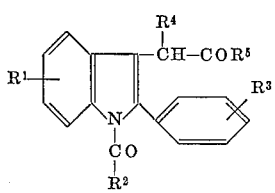   (I)

wherein $R^1$ and $R^3$ are hydrogen or halogen atoms, or lower alkyl, lower alkoxy, lower alkylthio or lower alkenyl groups, respectively, in which said alkyl, alkoxy, alkylthio or alkenyl groups have up to 3 carbon atoms; $R^2$ is an unsubstituted and saturated hydrocarbon chain having up to 6 carbon atoms, an unsubstituted and unsaturated hydrocarbon chain having up to 6 carbon atoms, a phenyl-, phenoxy- or halogen-substituted and saturated hydrocarbon chain having up to 6 carbon atoms, a phenyl-, phenoxy- or halogen-substituted and unsaturated hydrocarbon chain having up to 6 carbon atoms, an unsubstituted or lower alkyl-, lower alkoxy-, lower alkylthio- or halogen-substituted phenyl group or an unsubstituted or lower alkyl- or halogen-substituted five or six-membered heterocyclic ring having a nitrogen, sulfur or oxygen atom; $R^4$ is a hydrogen atom or a lower alkyl group having up to 3 carbon atoms; and $R^5$ is a hydroxy, lower alkoxy having up to 4 carbon atoms, benzyloxy, tetrahydropyranyloxy or amino group, and a process for preparation thereof.

Of the developed non-steroidal anti-inflammatory compounds, 1-(p-chlorobenzoyl)-2-methyl - 5 - methoxy-3-indolylacetic acid is greatest in activity. But it is high in toxicity. The present inventors also observed that even when 10 mg./kg. of said compound was orally administrated, a rat showed an occult bleeding. In addition thereto, all the conventional anti-inflammatory compounds tend to promote the bleeding of digestive organs and not few examples have been reported that perforations of the stomach and intestines brought one to death. Further, 1,2-diphenyl - 3,5 - dioxo - 4 - n - butylpyrazolidine (phenylbutazone), which is most widely used at present, has low activity in comparison to its high acute toxicity and hence is considerably small in therapeutic ratio.

The synthesis of indole derivatives having acyl groups at the N-positions is described in, for example, Elderfield: "Heterocyclic Compounds," vol. 3 (1952), chapter 1, pages 1–247, and W. C. Sumpter and F. M. Miller: "Heterocyclic Compounds With Indole and Carbazole Systems" (1954), pages 1–69. 1-substituted acyl groups of 1-acyl-indole derivatives are so easily hydrolyzed by acid or alkali that it has been considered impossible to obtain 1-acyl-indole derivatives directly from corresponding $N^1$-acylated phenylhydrazine derivatives by Fischer's indolization. Suvorov et al. [Suvorov et al.: Doklady Acad. Nauk U.S.S.R. 136, 840 (1961), Chem. Abstr., 55, 17621 (1961), J. Gen. Chem., U.S.S.R., 28, 1058 (1958)] have recently reported this problem as follows:

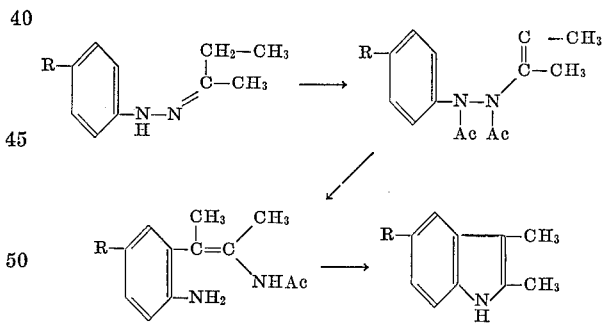

They have explained that an important requirement for indole formation is the deacylation of the $N^1$-acyl group of hydrazine derivative, which is free from a p-electron pair on the $N^1$-nitrogen atom.

In order to prepare an N-acyl indole derivative from an $N^1$-acyl phenylhydrazine derivative, the present inventors made repeated studies. And as a result, the present inventors have found that a 1-acyl-2-phenyl-3-indolylaliphatic acid derivative represented by the Formula I is prepared by reacting an $N^1$-acyl phenylhydrazine derivative represented by the formula,

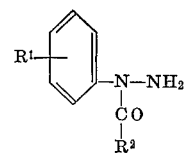   (II)

wherein $R^1$ and $^2$ have the same meanings as identified above, or a mineral acid salt thereof with a phenyl ketone compound represented by the formula,

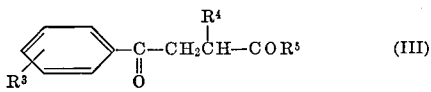

wherein $R^3$, $R^4$ and $R^5$ have the same meanings as identified above, whereby a ring formation proceeds. Further the present inventors have found that the 1-acyl-2-phenyl-3-indolylaliphatic acid derivative thus prepared has remarkable anti-inflammatory, analgesic and antipyretic actions.

The compounds of the present invention are novel and the ring formation have been entirely unknown heretofore.

One object of the present invention is to provide a novel 1-acyl-2-phenyl-3-indolylaliphatic acid derivative represented by the Formula I and a process for preparation thereof.

Another object of the present invention is to provide a pharmaceutical composition containing an effective amount of at least one of 1-acyl-2-phenyl-3-indolylaliphatic acid derivative represented by the Formula I as an active ingredient and pharmaceutical carrier.

Other objects of the present invention will be apparent from the following description.

According to the present invention, a 1-acyl-2-phenyl-3-indolylaliphatic acid derivative represented by the Formula I is prepared by reacting an $N^1$-acyl phenyl hydrazine represented by the Formula II or a mineral acid salt thereof with a phenyl ketone compound represented by the Formula III.

For reference, one example of the reaction of the present invention will be shown as follows:

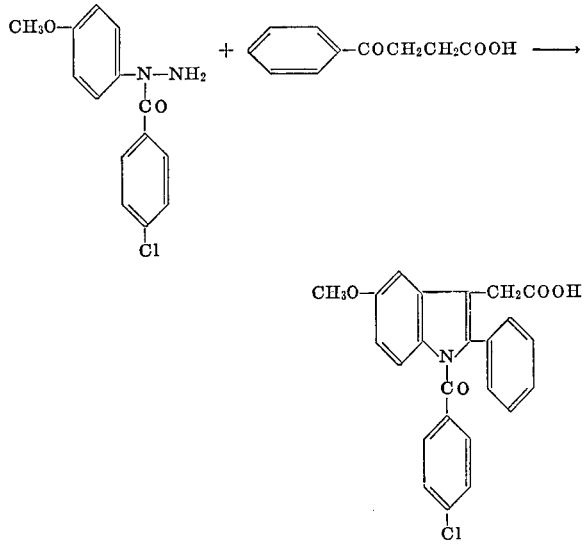

The present reaction proceeds even in the absence of solvent, but the use of suitable solvents is preferable in most cases. As useful solvents, there are, for example, organic acids such as acetic acid, formic acid, etc., nonpolar solvents such as benzene, cyclohexane, n-hexane, etc., and other organic solvent such as dimethylformamide. The present reaction proceeds even in the absence of a condensing agent, but the use of a suitable condensing agent may be available. As useful condensing agents, there are, for example, mineral acids such as hydrochloric acid, sulfuric acid, etc., Lewis acids such as zinc chloride, boron trifluoride, etc., and polyphosphoric acid. Generally, the reaction proceeds at a temperature within the range of 50°–200° C., but a preferable temperature range is 65°–95° C. The reaction completes in short period of time generally. After completion of the reaction, the desired product is directly obtained in the form of a precipitate, in general. In the case of separating no product, the solution is concentrated or a proper solvent such as acetic acid-water, water, petroleum ether, etc., is added to the reaction mixture, whereby crystals can be obtained.

$N^1$-acyl phenylhydrazine derivative employed as starting material in the process of the present invention is prepared by, for example, such reactions as shown below:

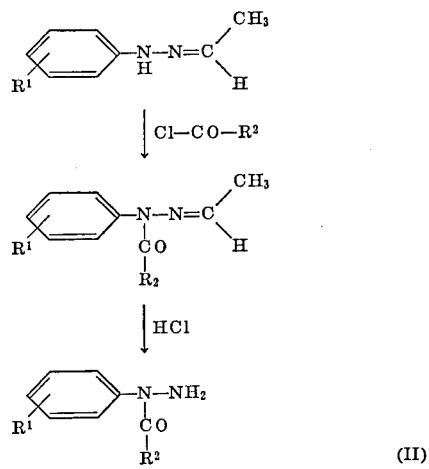

wherein $R^1$ and $R^2$ have the same meanings as identified above.

That is, for example, acetaldehyde phenylhydrazone derivative is subjected to acylation with acyl chloride in the presence of a suitable dehydrogenchloride agent such as pyridine in an inert organic solvent to obtain acetaldehyde $N^1$-acyl phenylhydrazone derivative, and the resultant acetaldehyde $N^1$-acyl phenylhydrazone derivative is dissolved in ethanol and then gaseous hydrogen chloride is introduced in the ethanolic solution, whereby the objective $N^1$-acyl phenylhydrazine derivative is prepared.

On the other hand, a phenyl ketone employed as starting material in the process of the present invention is known.

Accroding to the present process are obtained indole compounds having the following substituents of the Formula I.

$R^1$ and $R^3$: hydrogen atom, chlorine atom, bromine atom, methyl group, ethyl group, propyl group, methoxy group, ethoxy group, methylthio group, ethylthio group, allyl group, etc.

$R^2$—CO—: acetyl group, propionyl group, butyryl group, pentanoyl group, hexanoyl group, cinnamoyl group, chloroacetyl group, phenoxyacetyl group, hexadienoyl group, benzoyl group, p-chlorobenzoyl group, p-methylbenzoyl group, p-methoxybenzoyl group, p-methylthiobenzoyl group, nicotinoyl group, isonicotinoyl group, N-methylhexahydronicotinoyl group, 5-chloro-2-thenoyl group, 2-furoyl group, etc.

$R^4$: hydrogen atom, methyl group, ethyl group, etc.

$R^5$: hydroxy group, methoxy group, ethoxy group, i-propoxy group, t-butoxy group, benzyloxy group, tetrahydropyranyloxy group, amino group, etc.

The compounds illustrated as follows can be easily prepared according to the process of the present invention.

1-(p-chlorobenzoyl)-2-(p-chlorophenyl)-5-methoxy-3-indolylacetic acid 1-benzoyl-2-(p-chlorophenyl)-5-methoxy-3-indolylacetic acid 1-benzoyl-2-(p-methoxyphenyl)-5-methoxy-3-indolylacetic acid 1-(p-chlorobenzoyl)-2-phenyl-5-methyl-3-indolylacetic acid 1-(p-chlorobenzoyl)-2-phenyl-5-methoxy-3-indolylacetic acid 1-nicotinoyl-2-phenyl-5-methoxy-3-indolylacetic acid 1-(p-methylbenzoyl)-2-phenyl-5-methoxy-3-indolylacetic acid 1-acetyl-2-(p-methoxyphenyl)-5-methoxy-3-indolylacetic acid 1-(p-chlorobenzoyl)-2-(p-methylthiophenyl)-5-chloro-3-indolylacetic acid 1-(p-chlorobenzoyl)-2-(p-chlorophenyl)-3-indolylacetic acid α{1-(p-chlorobenzoyl)-2-phenyl-5-methoxy-3-indolyl} propionic acid α{1-(p-chlorobenzoyl)-2-phenyl-5-chloro-3-indolyl} propionic acid Further, according to the present invention, a pharmaceutical composition containing an effective amount of at least one of 1-acyl-2-phenyl-3-indolylaliphatic acid derivative represented by the Formula I as an active ingredient and pharmaceutical carrier is provided.

As mentioned above already, the compounds of the present invention have high biological and pharmacological activities, and show excellent effects for inflammation, but possess very low toxicity.

The many compounds of this invention are markedly low in toxicity, and even when over 1,000 mg./kg. of these compounds are orally administered to each of rat and mouse, they scarcely show toxic symptoms and occult bleeding is negative in feces thereof. Nevertheless, the activities of these compounds are much higher than usual anti-inflammatory drugs. Therefore, the therapeutic ratios of the compounds of the present invention are far greater than any other drugs. Therefore, these compounds are markedly valuable in practical use.

The therapeutic ratios of the compounds of the present invention and 1,2-diphenyl - 3,5 - dioxo-4-n-butylpyrazolidine (phenylbutazone) are given in the following table.

| Compound | Effects | | |
|---|---|---|---|
| | 50% inhibiting dose of carrageenin edema of rat's hind paw, per os, A (mg./kg.) | 50% lethal dose of rat, per os, B (mg./kg.) | Therapeutic ratio, B/A |
| 1,2-diphenyl-3,5-dioxo-4-n-butylpyrazolidine (phenylbutazone) | 320 | ca. 700 | ca. 2.2 |
| 1-(p-chlorobenzoyl)-2-phenyl-5-methoxy-3-indolylacetic acid (present compound) | 250 | >1,500 | >6.0 |
| 1-(p-methylbenzoyl)-2-phenyl-5-methoxy-3-indolylacetic acid (present compound) | 360 | >1,500 | >4.2 |

As clear from the table, 1-(p-chlorobenzoyl)-2-phenyl-5-methoxy-3-indolylacetic acid and 1-(p-methylbenzoyl)-2-phenyl-5-methoxy-3-indolylacetic acid are superior to phenylbutazone as anti-inflammatory drug.

The present inventors prepared many other 1-acyl-2-phenyl-3-indolylaliphatic acid derivatives than the compounds shown in the aforesaid table and evaluated the pharmaceutical effects thereof by animal tests.

The present inventors have found that many 1-acyl-2-phenyl-3-indolylaliphatic acid derivatives, which are prepared by the process of the present invention, are superior to 1,2-diphenyl-3,5-dioxo-4-n-butylpyrazolidine (phenylbutazone) in the therapeutic ratios thereof and has a great practical value.

It has been found that these compounds also have comparatively potent analgesic activities shown by Haffner's method, and antipyretic activities in a pyrogen test.

The following examples are given to illustrate the present invention more particularly but it is not intended to limit the present invention only to them.

EXAMPLE 1

A mixture of 6.3 g. of $N^1$-(p-chlorobenzoyl)-p-methoxyphenylhydrazine hydrochloride and 4.3 g. of β-(p-chlorobenzoyl)propionic acid was added to 30 ml. of acetic acid, and the mixture was heated at 70°–75° C. for 7 hrs. with stirring. And stirring was continued for additional 2 hrs. Thereafter acetic acid was distilled under reduced pressure to a residue, to which was added water and extracted with benzene. The benzene solution was dried over anhydrous sodium sulfate, and then benzene was evaporated to give brown resinous substance, which was solidified on standing at room temperature overnight. Recrystallization from ethanol gave light yellow crystals of 1-(p-chlorobenzoyl)-2-(p-chlorophenyl)-5-methoxy-3-indolylacetic acid, M.P. 196.5°–198° C.

Infrared absorption spectrum, $\nu_{max.}^{Nujol}$ (cm$^{-1}$): 1723 (—COOH), 1635 (—CO—N<)

Elementary analysis.—Calculated (percent): C, 63.44; H, 3.74; N, 3.08. Found (percent): C, 63.42; H, 3.98; N, 2.81.

According to the above-described procedure, following compounds were obtained.

EXAMPLE 2

1-benzoyl-2-(p-chlorophenyl) - 5 - methoxy-3-indolylacetic acid. White prisms. Melting point, 176°–177° C. Infrared absorption spectrum, $\nu_{max.}^{Nujol}$ (cm$^{-1}$): 1710, 1670

Elementary analysis.—Calculated (percent): C, 68.65; H, 4.29; N, 3.34. Found (percent): C, 68.39; H, 4.27; N, 3.43.

EXAMPLE 3

1-benzoyl-2-(p-methoxyphenyl) - 5 - methoxy-3-indolylacetic acid. Yellow prisms. Melting point, 172°–173.5° C. Infrared absorption spectrum, $\nu_{max.}^{Nujol}$ (cm$^{-1}$): 1713, 1685

Elementary analysis.—Calculated (percent): C, 72.28; H, 5.10; N, 3.37. Found (percent): C, 72.09; H, 5.24; N, 3.51.

EXAMPLE 4

A mixture of 6.0 g. of $N^1$-p-chlorobenzoyl-p-tolylhydrazine hydrochloride, 3.6 g. of β-benzoylpropionic acid and 20 ml. of acetic acid was heated under reflux for 2 hrs. After cooling, the reaction mixture was poured into 300 ml. of cold water, and extracted with 150 ml. of benzene. The benzene layer was washed with water, and dried over anhydrous magnesium sulfate, and the benzene solution was concentrated to a residue, which was column-chloromatographed on silica gel (eluent: benzene) to give light yellow crystals of 1-p-chlorobenzoyl-2-phenyl-5-methyl-3-indolylacetic acid. Recrystallization from benzene-hexane gave pure product, M.P. 171°–172° C.

Elementary analysis.—Calculated (percent): C, 71.37; H, 4.49; N, 3.47; Cl, 8.78. Found (percent): C, 71.15; H, 4.36; N, 3.31; Cl, 8.85.

EXAMPLE 5

A mixture of 6.2 g. of $N^1$-p-chlorobenzoyl-p-methoxyphenylhydrazine hydrochloride, 3.6 g. of β-benzoylpropionic acid and 20 ml. of acetic acid was refluxed for 30 min. After cooling, the reaction mixture was poured into 200 ml. of cold water, and the solidal product was precipitated. Recrystallization from benzenehexan, and then acetone-water gave yellow prisms of 1-(p-chlorobenzoyl)-2-phenyl-5-methoxy-3-indolylacetic acid, M.P. 163°–164° C.

Elementary analysis.—Calculated (percent): C, 68.65; H, 4.32; N, 3.34; Cl, 8.44. Found (percent): C, 68.91; H, 4.21; N, 3.26; Cl, 8.54.

EXAMPLE 6

A mixture of 5.3 g. of $N^1$-nicotinoyl-p-methoxyphenylhydrazine hydrochloride, 3.6 g. of β-benzoylpropionic acid and 20 ml. of acetic acid was heated and refluxed for 5 hrs. After cooling, the reaction mixture was poured into 300 ml. of water and extracted with benzene. The benzene layer was washed with water, and dried over anhydrous magnesium sulfate. The benzene was distilled to a residue, which was purified by columnochromatography using silica gel. The eluent of benzene-chloroform (1:1) was concentrated to give yellow crystals, which was recrystallized to give 1-nicotinoyl-2-phenyl-5-methoxy-3-indolyacetic acid, M.P. 222°–223° C.

*Elementary analysis.*—Calculated (percent): C, 71.49; H, 4.70; N, 7.25. Found (percent): C, 71.26; H, 4.62; N, 7.06.

EXAMPLE 7

A mixture of 5.9 g. of $N^1$-p-methylbenzoyl-p-methoxyphenylhydrazine hydrochloride, 3.6 g. of β-benzoylpropionic acid and 20 ml. of acetic acid was refluxed for 30 min. with stirring. After cooling, the reaction mixture was poured into 200 ml. of cold water. An amorphous precipitate was crystallized on treatment of benzene-hexane. Recrystallization from 60% aqueous ethanol gave 1-(p - methylbenzoyl)-2-phenyl-5-methoxy-3-indolylacetic acid, M.P. 180°–181° C.

*Elementary analysis.*—Calculated (percent): C, 75.17; H, 5.30; N, 3.51. Found (percent): C, 75.41; H, 5.26; N, 3.37.

EXAMPLE 8

A mixture of 6.2 g. of $N^1$-acetyl-p-methoxyphenylhydrazine and 8.3 g. of β-(p-methoxybenzoyl)-propionic acid was added to 30 ml. of glacial acetic acid and refluxed for 4 hrs. with 7 g. of dry hydrogen chloride and 0.7 g. of zinc chloride. After completion of the reaction, acetic acid was concentrated and added to water. And then the mixture was extracted with chloroform. The chloroform solution was dried over anhydrous sodium sulfate, and distilled to a oily substance, which is recrystallized from ethanol to give white needles of 1-acetyl-2-(p-methoxyphenyl) - 5 - methoxy - 3 - indolylacetic acid, M.P. 107°–109° C.

We claim:
1. A process for preparation of 1-acyl-2-phenyl-3-indolylaliphatic acid derivative represented by the formula,

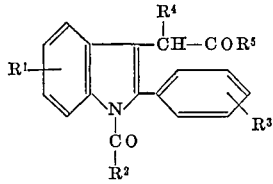

wherein $R^1$ and $R^3$ are hydrogen or halogen atoms, or lower alkyl, lower alkoxy, lower alkylthio or lower alkenyl, respectively, in which said alkyl, alkoxy, alkylthio or alkenyl have up to 3 carbon atoms; $R^2$ is a saturated or olefinically unsaturated hydrocarbon chain having up to 6 carbon atoms, which is unsubstituted or substituted with phenyl, phenoxy or a halogen atom, an unsubstituted or lower alkyl-, lower alkoxy-, lower alkylthio- or halogen-substituted phenyl or pyridine ring; $R^4$ is a hydrogen atom or lower alkyl having up to 3 carbon atoms; and $R^5$ is hydroxy, lower alkoxy having up to 4 carbon atoms or benzyloxy, which comprises reacting at an elevated temperature a $N^1$-acyl phenylhydrazine derivative represented by the formula,

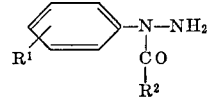

wherein $R^1$ and $R^2$ have the same meanings as identified above, with a phenyl ketone compound represented by the formula,

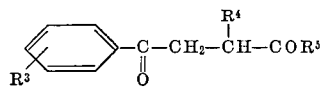

wherein $R^3$, $R^4$ and $R^5$ have the same meanings as identified above, to yield the 1-acyl-2-phenyl-3-indolyl alphatic acid derivative.

2. A process according to claim 1 wherein $R^1$ is alkoxy, $R^2$ is phenyl, $R^3$ is hydrogen, $R^4$ is hydrogen and $R^5$ is hydroxy.

3. A process according to claim 1 wherein $R^1$ is alkoxy, $R^2$ is halogen-substituted phenyl, $R^3$ is hydrogen, $R^4$ is hydrogen and $R^5$ is hydroxy.

4. A process according to claim 3 wherein $R^2$ is chlorophenyl.

5. A process according to claim 1 for the production of 1-(p-chlorobenzoyl)-2-phenyl - 5 - methoxy-3-indolylacetic acid.

6. A process according to claim 1 wherein said reaction proceeds in a solvent comprising acetic acid, formic acid, benzene, cyclohexane, n-hexane or dimethylformamide.

7. A process according to claim 1 wherein said reaction proceeds with a condensing agent comprising mineral acids.

8. A process according to claim 1 wherein said reaction proceeds at a temperature of from about 50 to about 200° C.

9. A process according to claim 8 wherein said temperature is from about 65 to about 95° C.

References Cited
UNITED STATES PATENTS
3,285,908 11/1966 Shen _____ 260—326.12X ALEX MAZEL, Primary Examiner J. A. NARCAVAGE, Assistant Examiner U.S. Cl. X.R.

260—294.8, 295, 295.5, 326.12, 558, 559, 999